United States Patent [19]
Forster et al.

[11] 3,953,781
[45] Apr. 27, 1976

[54] CONTROLLABLE AND QUENCHABLE RECTIFIER CIRCUIT FOR HIGH DIRECT CURRENT VALUES

[75] Inventors: Johannes Forster; Karl-Heinz Bezold, both of Berlin, Germany

[73] Assignee: Licentia Patent-Verwaltungs-G.m.b.H., Frankfurt am Main, Germany

[22] Filed: Dec. 11, 1974

[21] Appl. No.: 531,799

[30] Foreign Application Priority Data
Dec. 12, 1973 Germany............................ 2362375

[52] U.S. Cl............................ 321/27 R; 321/45 C
[51] Int. Cl.²........................................... H02M 7/00
[58] Field of Search.................... 321/27 R, 45 C, 47

[56] References Cited
UNITED STATES PATENTS

| | | | |
|---|---|---|---|
| 2,165,055 | 7/1939 | Kafka................................ | 321/27 R |
| 3,392,319 | 7/1968 | McColl et al...................... | 321/47 X |
| 3,800,198 | 3/1974 | Graf et al......................... | 321/45 C X |
| 3,824,446 | 7/1974 | Forster et al. ..................... | 321/12 |
| 3,849,718 | 11/1974 | Forster et al................... | 321/45 C X |
| 3,857,083 | 12/1974 | Lundstrom........................ | 321/27 R |

*Primary Examiner*—William M. Shoop
*Attorney, Agent, or Firm*—Spencer & Kaye

[57] ABSTRACT

A controllable and quenchable rectifier circuit for high d.c. current values, which is fed from an alternating or three-phase current main and includes a plurality of controllable rectifier elements each having associated therewith quenching devices to reduce feedback to the main. A plurality of like controllable and quenchable partial rectifier circuits are provided which are connected in parallel on the a.c. or input side in a rigid and low impedance manner and which are each connected on the d.c. or output side via impedances to two bus bars which feed a load. The current conducting controllable and quenchable rectifier elements of the rectifier circuits are quenched in a stepped sequence.

6 Claims, 3 Drawing Figures

3,953,781

CONTROLLABLE AND QUENCHABLE RECTIFIER CIRCUIT FOR HIGH DIRECT CURRENT VALUES

BACKGROUND OF THE INVENTION

The present invention relates to a controllable and quenchable current rectifier circuit fed from an alternating current or three-phase current main wherein the controllable rectifier elements of the circuit have quenching devices associated to them to reduce the feedback into the main.

Controllable rectifiers can be substantially improved with issued to their feedback into the mains, which is caused Forster by their drawing reactive current, if they are operated to be self-commutating with the aid of quenching devices. Such controllable and quenchable rectifiers improve the power factor $\lambda = P/S$, i.e., the ratio of effective output P at the mains to the apparent output S, because they reduce the inductive control power as well as the reactive commutating power of conventional circuits or avoid them completely. The quenching devices substantially comprise quenching capacitors, quenching thyristors and charging diodes which serve to charge the quenching capacitors. The quenching capacitors must be dimensioned to provide a sufficiently long protective period for the thyristors of the rectifier circuit which are to be quenched, the protective period being longer than the recovery time of the thyristors to be quenched. In addition to assuring a sufficiently long protective period, a decisive point of view for the stress on the rectifier or on the components parts, and thus the total expenditures, is the prevention of excess voltages during or after quenching.

United States Patent No. 3,824,446, Forster Feb. 22nd, 1973, to Johannes Forstor et al, the subject matter of which is incorporated herein by reference, already discloses controllable rectifier circuit arrangements in which these quenching voltage peaks can be kept low by the use of quenching capacitors and supplemental capacitors which act as voltage limiting capacitors. The quenching of current in rectifier circuit arrangements which carry high currents with values of more than about 1000 A, however, poses particular problems.

SUMMARY OF THE INVENTION

It is the object of the present invention to provide a controllable and quenchable rectifier circuit for large currents in which the voltage peaks occurring during quenching are limited to low values and the required expenditures for capacitors are kept low, respectively.

This is accomplished, according to the present invention, by in effect dividing the rectifier circuit into a plurality of controllable and quenchable partial rectifier circuits, i.e., providing a plurality of like rectifier circuits, which are connected in parallel on the a.c. or input side in a rigid and low-impedance manner and which are connected on the d.c. side, via impedances, to two bus bars which feed a load, and by quenching the current-conducting rectifier elements of the respective partial rectifier circuits in successive stages.

DESCRIPTION OF THE PREFERRED EMBODIMENTS

Figure 1:
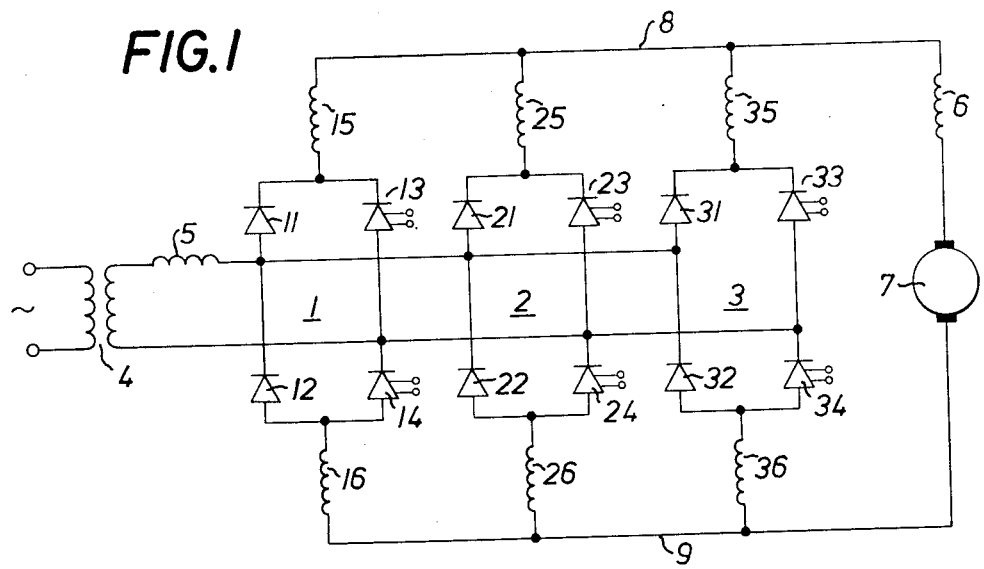
FIG. 1 is a schematic circuit diagram of a current rectifier circuit according to the invention.

Referring now to FIG. 1, there is shown an embodiment of a rectifier circuit, according to the invention, which includes three parallel-connected controllable and quenchable asymmetrical single phase rectifier bridge circuits 1, 2 and 3, as partial rectifier circuits which are fed by a common a.c. source via the secondary winding 4 of an input transformer and which, via bus bars 8, 9, feed a common load including a d.c. motor 7 with a series-connected smoothing choke 6. Each of the rectifier bridge circuits 1, 2 and 3 is provided with two diodes 11, 12 or 21, 22, or 31, 32, respectively, and two controllable rectifier elements, i.e., thyristors, 13, 14 or 23, 24 or 33, 34, respectively, which form the four arms of the respective bridge circuits. In a well known manner each of the thyristors has associated therewith a respective quenching arrangement. The quenching devices which are associated to the individual thyristors of the respective partial rectifier circuits, 1, 2, 3 may be combined in the usual manner of a quenching capacitor, a quenching thyristor, which receives control pulses for quenching the thyristors of the partial rectifier circuits 1, 2, 3, and a charging diode. The partial rectifier circuits 1, 2, 3 are connected in parallel at the a.c. or input side in a rigid and low impedance manner, i.e., at the a.c. side they only have a common inductance which is the same for all partial rectifier circuits. This stray and line inductance 5 of the magnitude L feeds an energy $1/2L\ i^2$ (where i is the transformer current) and produces, during quenching of the thyristors 13–14, 23–24 and 33–34 an induced voltage which is additively superimposed on the alternating voltage of the a.c. current supply main and which depends on the slope of the decaying current i.

In order to prevent the current component from the individual partial rectifier circuit 1, 2, or 3 which is switched off during quenching of its respective thyristors from commutating to the partial rectifier circuits 1, 2, or 3 which are conducting and to conduct this current component through the respective diode branches of the quenched partial rectifier circuits 1, 2, or 3, a further feature of the invention provides each partial rectifier circuit 1, 2, 3, with additional impedances in the form of a pair of choke coils 15 – 16, 25 – 26, and 35 – 36, respectively which are connected between the output terminals of the respective partial rectifier circuits and the associated bus bar 7 or 8. These additional impedances can have substantially smaller dimensions than the smoothing choke 6 which is connected ahead of the d.c. motor 7, since they need to absorb only the difference of the voltage-time areas between quenching of the first rectifier circuit 1, 2 or 3 and quenching of the last rectifier circuit.

Figure 1A:
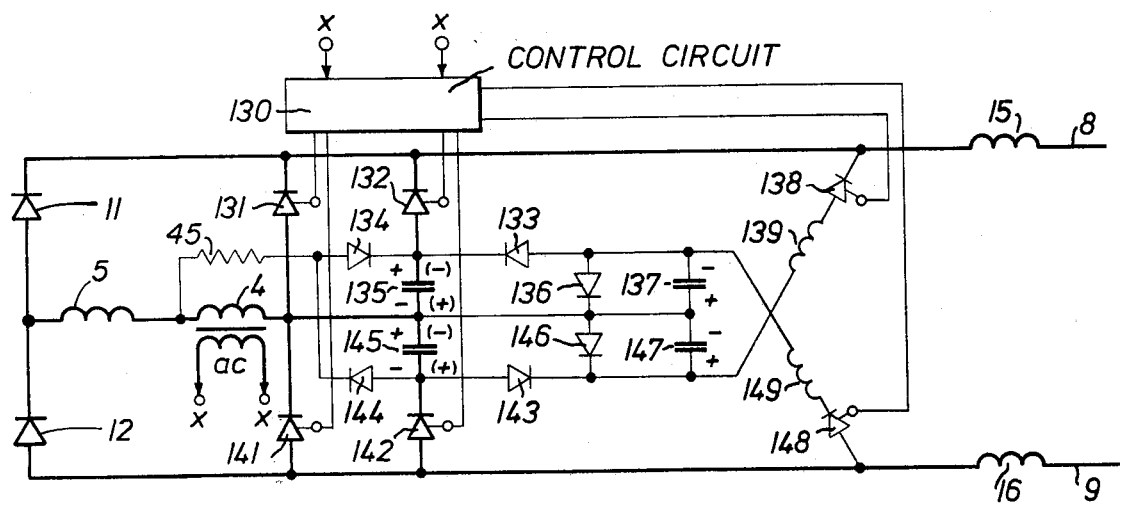
FIG. 1a is a detailed circuit diagram of one of three partial rectifying bridge circuits of FIG. 1 including the associated quenching circuit arrangement.

The controlled rectifier circuit shown in FIG. 1a represents in more detail one of the three partial rectifier circuits 1, 2 or 3, for instance the partial rectifier circuit 1 of FIG. 1. It includes a single phase bridge circuit having controlled rectifiers 131, 141 each connected in a respective one of two branches and noncontrolled rectifiers 11, 12 each connected in a respective one of the other two branches. The secondary winding 4 of the input transformer and the series connected inductance 5 are disposed in the diagonal of the bridge circuit, i.e. between the A.C. input terminals of the bridge circuit. The primary winding of the transformer is connected to the A.C. supply voltage to furnish the A.C. supply voltage to the rectifier circuit. Each controlled rectifier 131, 141 has associated with it a respective quenching circuit which includes the series connection of a quenching thyristor 132 or 142 and a quenching capacitor 135 or 145, respectively, with each of the series circuits 135 and 132 or 145 and 142 being connected in parallel with the associated controlled rectifiers 131 or 141 respectively.

Charging diodes 134, 144 which are each connected with one of the terminals of the secondary winding 4 via a common charging resistor 45 establish the charging paths for the quenching capacitors.

Each quenching capacitor 135, 145 is connected in parallel with a respective supplemental capacitor 137, 147 via a respective coupling diode 133, 143. The supplemental capacitors 137 and 147 are connected in series. The coupling diodes 133 and 143 are arranged with such an orientation that the supplemental capacitors 137 and 147, in contrast to the quenching capacitors 135 and 145, cannot be charged via the charging diodes 134 and 144 respectively. Diodes 136 and 146, which are each connected in parallel with a respective one of the supplemental capacitors 137 and 147, are also provided to prevent these supplemental capacitors from taking on another polarity than that shown.

The positive terminal of the series connection of the supplemental capacitors 137 and 147 is connected, via an auxiliary thyristor 138, with a choke coil 15 which is connected to the positive output terminal of the rectifier circuit and the negative terminal of the series connection of capacitors 137 and 147 is connected, via a further auxiliary thyristor 148, to another choke coil 16 which is connected to the negative output terminal of the rectifier circuit. Reactances 139, 149 which are each connected in series with an associated auxiliary thyristor 138, 148 are utilized to favorably modify the current load in the auxiliary thyristors 138, 148 respectively.

The circuit arrangement of the embodiment of the present invention shown in FIG. 1a operates as follows:

The two quenching capacitors 135, 145 are charged to the polarity shown in FIG. 1a by the A.C. supply voltage, from the secondary coil 4 of the input transformer, through the charging paths including the charging diodes 134, 144 and charging resistor 45. In a known manner, the control circuit 130, which monitors the A.C. supply voltage, can also supply the firing signals to the quenching thyristor 132 or 142 for firing the respective thyristor at a selected time which causes the discharge of the quenching capacitor 135 or 145, respectively, connected in series therewith. Such a control circuit is shown in F. W. Gulzwiller et al, SILICON CONTROLLED RECTIFIER MANUAL, Third Edition, General Electric Company (1944), FIG. 8.2.3 on page 136 and described in chapter 8.4, beginning on page 130.

This discharge of the quenching capacitor 135 or 145 initiates the quenching of the associated controlled rectifier 131 or 141, respectively. Consequently, the quenching capacitor is subsequently recharged from the polarity illustrated to the polarity indicated in parentheses. This recharging of the quenching capacitors with an opposite polarity occurs because the current flowing through the transformer winding 4 commutates from the controlled rectifier to the fired quenching thyristor and thus the energy stored in the circuit, particularly in the inductance of the transformer, is transferred to the capacitance effective in the recharging circuit. Assuming, for example, that the controlled rectifier 131 is conducting current, then by firing the quenching thyristor 132 the quenching capacitor 135, which is charged to the polarity illustrated, will be connected in parallel with the controlled rectifier 131 so that the current in the rectifier 131 is quenched. The current flowing through transformer winding 4 commutates from the controlled rectifier 131 to the quenching thyristor 132 so that the quenching capacitor 135 is recharged in the direction indicated in the parentheses. At the moment when the polarity of the capacitor voltage is reversed due to the recharging, the blocking diode 133, which had previously been in a blocking condition by the initial voltage on the quenching capacitor 135, becomes conductive so that the supplemental capacitor 137 is now connected in parallel with the quenching capacitor 135. Consequently the current now flows from the transformer winding 4 through the quenching capacitor 135 and on the other hand through the supplemental capacitor 137 and the blocking diode 133.

Figure 2:
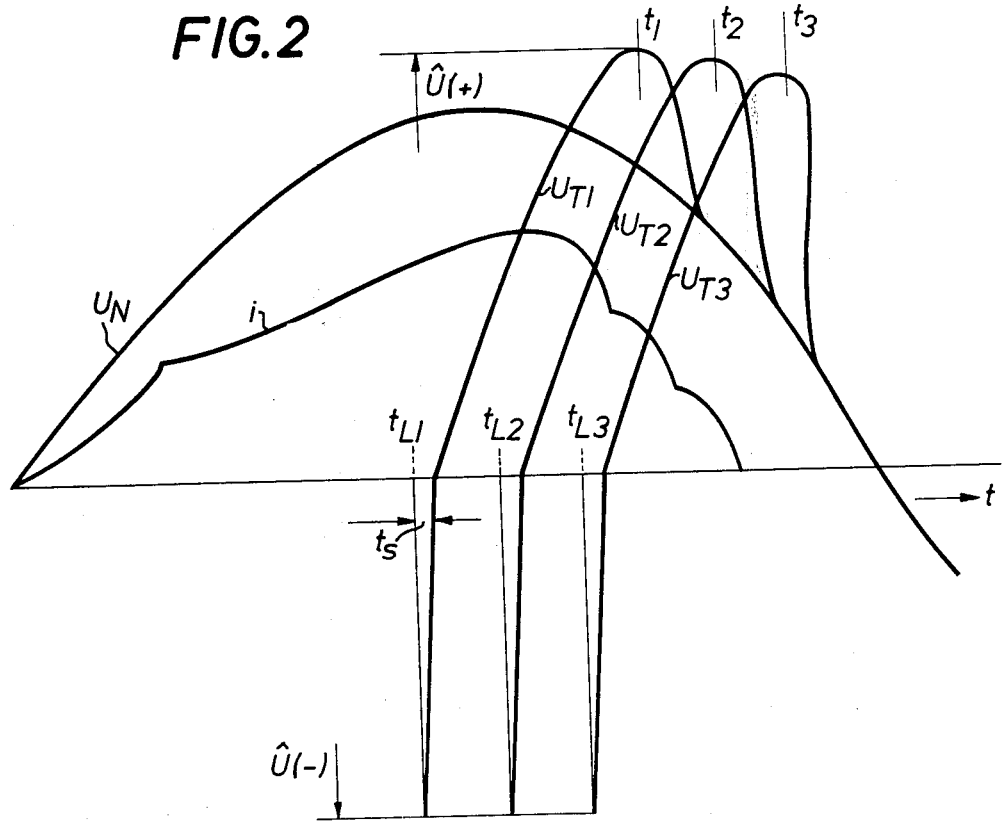
FIG. 2 shows the time sequence of the blocking voltages at the controllable and quenchable thyristors of the individual partial rectifiers of the embodiment of FIG. 1.

FIG. 2, which will serve to explain in detail the operation of the rectifier circuit according to the present invention, shows the time sequence for the blocking voltages $U_{T1}$, $U_{T2}$, and $U_{T3}$ at the controllable and quenchable thyristors of the partial rectifier circuits 1, 2, and 3, the curve of the a.c. main voltage $U_N$ and that of current i in the transformer coil 4. The individual thyristor pairs 13–14, 23–24 or 33–34, respectively, of the partial rectifier circuits, 1, 2, 3 are to be quenched in successive stages at times $t_{L1}$, $t_{L2}$ or $t_{l3}$, respectively. A sufficient protective period $t_s$ for the quenchable thyristors of the partial rectifier circuits is assured if the negative blocking voltage is brought to a peak voltage value $\hat{u}(-)$ by discharging the quenching capacitor and if it remains negative for a sufficiently long period of time due to a sufficient capacity of the quenching capacitor. In the illustrated blocking voltage curves $U_{T1}$ to $U_{T3}$ it is assumed that after zero passage of the blocking voltages, limiting capacitors are connected in parallel to the quenching capacitors so that the voltage rise time $du/dt$ decreases and a bend is produced in the curve of the blocking voltage.

The positive peak values $\hat{u}(+)$ of the blocking voltages which occur at times $t_1$, $t_2$ and $t_3$ are critical for the voltage stress on the thyristors of the rectifier circuits in particular. The peak values can be determined from the capacitor capacitance, the total effective inductance L and the current i, or the slope of its decay, respectively. Substantially, the idea is to convert and master the magnetic energy $1/2L\,i^2$ stored in the inductance L. By in effect dividing the rectifier circuit into a plurality of partial rectifier circuits as provided by the present invention and quenching the quenchable thyristors of the partial rectifier circuits in stages it is accomplished that the positive peak values $\hat{u}(+)$ will not be too high, as a result of a high capacitor current surge, to quench a rectifier which carries the entire current and that the still conducting partial rectifier circuits will also conduct the rectified voltage peaks from the quenched partial rectifier circuits to the load and thus also a corresponding portion of the energy connected therewith. In this way it is possible to maintain the capacitive store as a whole at a small size and to supply the load with substantially all of the magnetic energy. In the rectifier arrangement selected for the illustrated embodiment it is also possible to do without additional capacitors for voltage limitation for the first two quenchings of the three parallel connected partial rectifier circuits. In spite of the stepped quenching of the thyristors in the individual partial rectifier circuits, the current curve — as can be seen in FIG. 2 — will more closely approach the sine shape, which is equivalent to a reduction of the harmonic content and thus of the reactive power requirement of the rectifier arrangement.

In order to assure that the positive blocking voltage peaks $\hat{u}$ (+) will not coincide in time, the time intervals during quenching of the thyristors must be sufficiently large, and is preferably a multiple of the protective period $t_s$ of the quenchable thyristors of the partial rectifier circuits. The number of partial rectifier circuits and the differences in time during quenching of the thyristors will depend substantially on the magnitude of the total current.

In order to compensate the current load in the partial rectifier circuits over several periods of the voltage in the main, the quenching sequence of the individual partial rectifier circuits, according to a further feature of the present invention, changes in cycles.

These changes are done by a main control circuit which gives pulses $x$ to the input sides of the control circuits and it is built like a ring counter as shown and described in the above mentioned Silicon Controlled Rectifier Manual, chapter 12.5.3, page 229.

Use of the idea of the present invention of in effect dividing the rectifier circuit into a plurality of like partial rectifiers and quenching them in stages is possible also within the scope of the invention for higher-phased rectifier circuits.

It will be understood that the above description of the present invention is susceptible to various modifications, changes and adaptations, and the same are intended to be comprehended within the meaning and range of equivalents of the appended claims.

We claim:

1. In a rectifier circuit for alternating current including a rectifying bridge circuit having a plurality of controllable rectifier elements, a separate quenching means for each of said controllable rectifier elements for reducing feedback to the main, first means for connecting the input of said bridge circuit to an alternating current main, a pair of bus bars for connection to a load, and second means for connecting each of the output terminals of said bridge circuit to a respective one of said pair of bus bars, the improvement wherein: said rectifier circuit includes a plurality of said rectifying bridge circuits with each of the controllable rectifier elements of each of said bridge circuits having a separate quenching means associated therewith; said first means connects the inputs of all of said bridge circuits in parallel to the alternating current main in a rigid and low impedance manner, said second means includes a separate impedance connected between each of said output terminals and the associated one of said bus bars; and further comprising means for controlling said quenching means to quench the associated controllable rectifier elements of the respective bridge circuits in a stepped sequence, whereby the rectifier circuit may be utilized for high d.c. current values.

2. A rectifier circuit as defined in claim 1 wherein said impedances of said second means are chokes.

3. A rectifier circuit as defined in claim 1 wherein the time differences between the quenching of the controllable rectifier elements of the respective rectifying bridge circuits is a multiple of the protective period of the controllable rectifier elements.

4. A rectifier circuit as defined in claim 1 wherein the time differences between the quenching of the controllable rectifying elements of the respective rectifying bridge circuits are proportional to the magnitude of the total current to be quenched.

5. A rectifier circuit as defined in claim 1 wherein the quenching sequence of the rectifying bridge circuits can be cyclically varied.

6. A rectifier circuit as defined in claim 1 further including supplemental capacitors for limiting the positive blocking voltages at the controllable rectifier elements associated with a portion of the rectifying bridge circuits at the outputs thereof, said supplemental capacitors discharg into the load.

* * * * *